United States Patent Office 3,737,468
Patented June 5, 1973

3,737,468
HALOGENATED METHANONAPHTHALENE AND
DIMETHANOPHENANTHRENE COMPOUNDS
Robert A. Dombro, Chicago, Ill., assignor to Universal
Oil Products Company, Des Plaines, Ill.
No Drawing. Filed Aug. 3, 1970, Ser. No. 60,655
Int. Cl. C07c 23/46
U.S. Cl. 260—648 C                                     6 Claims

ABSTRACT OF THE DISCLOSURE

Novel compositions of matter comprising polyhalo-substituted ethylenepolyhydroalkanonaphthalenes and polyhalo - substituted ethylenepolyhydrodialkanophenanthrenes as exemplified by 1,2,3,4,9,9-hexachloro-5,6-(1,2-dichloroethylene) - 1,4,4a,5,6,8a - hexahydro - 1,4 - methanonaphthalene or 1,2,3,4,5,6,7,8,11,11,12,12-dodecachloro - 9,10 - (1,2 - dichloroethylene) - 1,4,4a,5,5a,8,8a,9,10,10a - decahydro - 1,4,5,8 - dimethanophenanthrene are useful as additives to polymeric materials whereby desirable physical characteristics of flame retardancy are imparted to these materials.

---

This invention relates to novel compounds comprising halo-substituted polycyclic compounds. More specifically, the invention relates to these compounds and to their use thereof as additives to polymers, resins, polycondensates or other compounds, either naturally occurring or synthetic in origin whereby certain desirable physical characteristics are imparted to these compounds. In addition, to providing the desirable physical characteristics of flame retardancy or fire resistance to compounds of the type hereinafter set forth in greater detail, the novel compounds of the present invention may also be useful as insecticides or as interemdiates in the preparation of other desirable chemical compositions of matter. As hereinbefore set forth, these novel compositions of matter may be useful as additives to plastics, polymers, co-polymers, terpolymers, resins, polycondensates, elastomers, rubbers, textiles and fibers, both naturally occurring and synthetic in nature, coatings, paints, varnishes, leather, foams, cellulose acetate butyrate, ethyl cellulose, cellulose propionate, polyolefins such as polyethylene and polyethylene copolymers, polypropylene and polypropylene co-polymers, polystyrenes, polystyrene co-polymers, polyvinyl acetate or alcohol and copolymers, polyesters, polyurethane, polyphenyl ethers, polycarbonates, polyamides, polyoxymethylenes, polyalkylene oxides such as polyethylene oxide, polyacrylates, polymethacrylates and their co-polymers with styrene, butadiene, acrylonitrile, etc., epoxy resins, acrylonitrile-butadiene-styrene formulations (commonly known as ABS), polybutylene and acrylic ester-modified-styrene-acrylonitrile (ASA), etc., whereby the desirable physical characteristics of flameproofing or fire retardancy will be imparted to the aforementioned materials. By utilizing the particular novel compounds of the present invention, the aforementioned desirable physical characteristics of flame proofing or fire resistance will possess special advantages when preparing the aforementioned plastics, polymers, resins, various rubbers, textiles, etc., which are to be utilized in places which may be subjected to excessive heat or to the action of a possible flame, such places including architectural panels for construction work, wall plugs for electrical connections, sound-proofing material in walls, ceilings, etc., cushions for various vehicle seats such as airplane seats, automobile seats, bus seats, etc. In addition, the compound when utilized as a constituent of paint, lacquer, varnished, or protective coatings, films, etc., will also impart a flame resistance to these compounds and, therefore, render them commercially attractive as articles of commerce. Also, besides imparting the desirable physical characteristics of flame retardancy to the various articles of manufacture, the additives will render certain polymeric compounds more stable to color changes and, therefore, will be important components of these compounds whenever it is desirable that discoloration of the finished product is to be avoided or will tend to render such articles unusable.

It is therefore an object of this invention to provide novel compounds which possess desirable physical properties.

Another object of this invention is to provide novel compounds possessing flame proofing or fire resistance characteristics which render these compounds important commercial articles of manufacture which may be used as additives in other chemical formulations.

In one aspect an embodimentof this invention resides in a compound selected from the group consisting of polyhalo - substituted ethylenepolyhydroalkanonaphthalenes and polyhalo-substituted ethylenepolyhydrodialkanophenanthrenes.

Another embodiment of this invention is found in a composition of matter comprising a polymeric material and a compound selected from the compound consisting of polyhalo-substituted ethylenepolyhydroalkanonapthalenes and polyhalo-substituted ethylenepolyhydrodialkanophenanthrenes.

A specific embodiment of this invention is found in a novel compound comprising 1,2,3,4,9,9-hexachloro-5,6-(1,2 - dichloroethylene) - 1,4,4a,5,6,8a - hexahydro - 1,4-methanonaphthalene.

Another specific embodiment of this invention is found in a composition of matter comprising polypropylene and 1,2,3,4,9,9 - hexachloro - 5,6 - (1,2 - dichloroethylene)-1,4,4a,5,6,8a-hexahydro-1,4-methanonapthalene.

Other objects and embodiments will be found in the following further detailed description of the present invention.

As hereinbefore set forth the present invention as concerned with novel compositions of matter comprising polyhalo - substituted ethylenepolyhydroalkanonaphthalenes and polyhalo-substituted ethylenepolyhydrodialkanophenanthrenes, and to the uses thereof as components or additives to polymeric materials. These novel compositions of matter will possess the generic formulae:

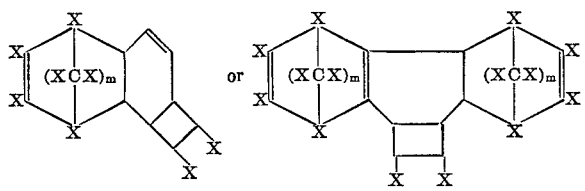

in which X may be hydrogen or halogen, at least two X's being halogen and preferably chlorine or bromine, and m is an integer of from 1 to 4. Some specific examples of these novel compounds will include, 1-chloro-5,6-(1,2-dichloroethylene)-1,4,4a,5,6,8a-hexahydro-1,4-methanonaphthalene;
1,2-dichloro-5,6-(1,2-dichloroethylene)-1,4,4a,5,6,8a-hexahydro-1,4-methanonaphthalene;
1,2,3-trichloro-5,6-(1,2-dichloroethylene)-1,4,4a,5,6,8a-hexahydro-1,4-methanonaphthalene;
1,2,3,4-tetrachloro-5,6-(1,2-dichloroethylene)-1,4,4a,5,6,8a-hexahydro-1,4-methanonaphthalene;
1,2,3,4,9-pentachloro-5,6-(1,2-dichloroethylene)-1,4,4a,5,6,8a-hexahydro1,4-methanonaphthalene;
1,2,3,4,9,9-hexachloro-5,6-1,2-dichloroethylene)-1,4,4a,5,6,8a-hexahydro-1,4-methanonaphthalene;
1-bromo-5,6-(1,2-dibromoethylene)-1,4,4a,5,6,8a-hexahydro-1,4-methanonaphthalene;

1,2-dibromo-5,6-(1,2-dibromoethylene)-1,4,4a,5,6,8a-hexahydro-1,4-methanonaphthalene;
1,2,3-tribromo-5,6-1,2-dibromoethylene)-1,4,4a,5,6,8a-hexahydro-1,4-methanonaphthalene;
1,2,3,4-tetra-5,6-(1,2-dibromoethylene)-1,4,4a,5,6,8a-hexahydro-1,4-methanonaphthalene;
1,2,3,4,9-pentabromo-5,6-(1,2-dibromoethylene)-1,4,4a,5,6,8a-hexahydro-1,4-methanonaphthalene;
1,2,3,4,9,9-hexabromo-5,6-(1,2-dibromoethylene)-1,4,4a,5,6,8a-hexahydro-1,4-methanonaphthalene;
1,2,3-trichloro-5,6-(1,2-dichloroethylene)-1,4,4a,5,6,8a-hexahydro-1,4-ethanonaphthalene;
1,2,3,4-tetrachloro-5,6-(1,2-dichloroethylene)-1,4,4a,5,6,8a-hexahydro-1,4-ethanonaphthalene;
1,2,3,4,9,9,10,10a-octachloro-5,6-(1,2-dichloroethylene)-1,4,4a,5,6,8a-hexahydro-1,4-ethanonaphthalene;
1,2,3-tribromo-5,6-(1,2-dibromoethylene)-1,4,4a,5,6,8a-hexahydro-1,4-ethanonaphthalene;
1,2,3,4-tetrabromo-5,6-(1,2-dibromoethylene)-1,4,4a,5,6,8a-hexahydro-1,4-ethanonaphthalene;
1,2,3,4,9,9,10,10a-octabromo-5,6-(1,2-dibromoethylene)-1,4,4a,5,6,8a-hexahydro-1,4-ethanonaphthalene;
1,8-dichloro-9,10-(1,2-dichloroethylene)-1,4,4a,5,5a,8,8a,9,10,10a-decahydro-1,4,5,8-dimethanophenanthrene;
1,4,5,8-tetrachloro-9,10-(1,2-dichloroethylene)-1,4,4a,5,5a,8,8a,9,10,10a-decahydro-1,4,5,8-dimethanophenanthrene;
1,2,7,8-tetrachloro-9,10-(1,2-dichloroethylene)-1,4,4a,5,5a,8,8a,9,10,10a-decahydro-1,4,5,8-dimethanophenanthrene;
1,2,3,6,7,8-hexachloro-9,10-(1,2-dichloroethylene)-1,4,4a,5,5a,8,8a,9,10,10a-decahydro-1,4,5,8-dimethanophenanthrene;
1,2,3,4,5,6,7,8-octahydro-9,10-(1,2-dichloroethylene)-1,4,4a,5,5a,8,8a,9,10,10a-decahydro-1,4,5,8-dimethanophenanthrene;
1,2,3,4,5,6,7,8,11,11,12,12-dodecachloro-9,10-(1,2-dichloroethylene)-1,4,4a,5,5a,8,8a,9,10,10a-decahydro-1,4,5,8-dimethanophenanthrene;
1,8-dibromo-9,10-(1,2-dibromoethylene)-1,4,4a,5,5a,8,8a,9,10,10a-decahydro-1,4,5,8-dimethanophenanthrene;
1,4,5,8-tetrabromo-9,10-(1,2-dibromoethylene)-1,4,4a,5,5a,8,8a,9,10,10a-decahydro-1,4,5,8-dimethanophenanthrene;
1,2,7,8-tetrabromo-9,10-(1,2-dibromoethylene)-1,4,4a,5,5a,8,8a,9,10,10a-decahydro-1,4,5,8-dimethanophenanthrene;
1,2,3,6,7,8-hexabromo-9,10-(1,2-dibromoethylene)-1,4,4a,5,5a,8,8a,9,10,10a-decahydro-1,4,5,8-dimethanophenanthrene;
1,2,3,4,5,6,7,8-octabromo-9,10-(1,2-dibromoethylene)-1,4,4a,5,5a,8,8a,9,10,10a-decahydro-1,4,5,8-dimethanophenanthrene;
1,2,3,4,5,6,7,8,11,11,12,12-dodecabromo-9,10-(1,2-dibromoethylene)-1,4,4a,5,5a,8,8a,9,10,10a-decahydro-1,4,5,8-dimethanophenanthrene;
1,8-dichloro-9,10-(1,2-dichloroethylene)-1,4,4a,5,5a,8,8a,9,10,10a-decahydro-1,4,5,8-diethanophenanthrene;
1,4,5,8-tetrachloro-9,10-(1,2-dichloroethylene)-1,4,4a,5,5a,8,8a,9,10,10a-decahydro-1,4,5,8-diethanophenanthrene;
1,2,3,4,5,6,7,8,11,11,12,12,13,13,14,14-hexachloro-9,10-(1,2-dichloroethylene)-1,4,4a,5,5a,8,8a,9,10,10a-decahydro-1,4,5,8-diethanophenanthrene;
1,8-dibromo-9,10-(1,2-dibromoethylene)-1,4,4a,5,5a,8,8a,9,10,10a-decahydro-1,4,5,8-diethanophenanthrene;
1,4,5,8-tetrabromo-9,10-(1,2-dibromoethylene)-1,4,4a,5,5a,8,8a,9,10,10a-decahydro-1,4,5,8-diethanophenanthrene;
1,2,3,4,5,6,7,8,11,11,12,12,13,13,14,14-hexabromo-9,10-(1,2-dibromoethylene)-1,4,4a,5,5a,8,8a,9,10,10a-decahydro-1,4,5,8-diethanophenanthrene.

It is also contemplated within the scope of this invention that compounds containing dissimilar halogen atoms such as 1,2,3,4,9,9-hexachloro-5,6-(1,2-dibromoethylene)-1,4,4a,5,6,8a-hexahydro-1,4-dimethanonaphthalene;
1,2-dibromo-5,6-(1,2-dichloroethylene)-1,4,4a,5,6,8a-hexahydro-1,4-dimethanonaphthalene;
1,2,3,4,5,6,7,8,11,11,12,12-dodecachloro-9,10-(1,2-dibromoethylene)-1,4,4a,5,6,8a-hexayhdro-1,4-dimethanophenanthrene, may also fall within the generic formulas hereinbefore set forth and be utilized in a manner more specifically described in the latter portion of this specification. It is also understood that the aforementioned compounds are only representative of the novel compounds of the present invention, and that said invention is not necessarily limited thereto.

The aforesaid novel compositions of matter are prepared by condensing a 7,8-dihalobicyclo-[4.2.0]-octadiene-2,4 with a halo-substituted cycloalkadiene which possesses the generic formula:

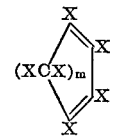

in which X is selected from the group consisting of hydrogen and halogen, at least 1 X being halogen preferably being chlorine or bromine and $m$ is an integer of from 1 to 4. The condensation is effected at temperatures ranging from about 75 up to about 200° C. and at a pressure ranging from atmospheric up to about 100 atmospheres, said pressure being sufficient to maintain the major portion of the reactants in the liquid phase. In addition, the condensation may be effected in the presence of a substantially inert organic solvent, said solvents including aromatic hydrocarbons such as benzene, o-xylene, m-xylene, p-xylene, ethylbenzene, etc.; aliphatic paraffins such as n-pentane, n-hexane, n-heptane, etc.; or cycloalkyl paraffins such as cyclopentane, methyl cyclopentane, cyclohexane, etc. It is also contemplated within the scope of this invention that the condensation be effected in the presence of an alkaline substance, such as sodium carbonate, potassium carbonate, lithium carbonate, etc. The mole ratio of the reactants will be dependent upon whether the desired product comprises a naphthalene or phenanthrene compound. For example, when a naphthalene compound is desired the halo-substituted cycloalkadiene will be present in a mole ratio of from about 1:1 to about 3:1 mole of halo-substituted cycloalkadiene per mole of bicyclooctadiene. However, if so desired, the process comprising a phenanthrene compound, the halo-substituted cycloalkadiene will be present in a greater excess, that is, a mole of from about 3.2:1 to about 6:1 moles of halo-substituted cycloalkadiene per moles of bicyclooctadiene.

The process of preparing the novel compounds may be effected in any suitable manner and may comprise a batch or continuous type operation. For example, when a batch type operation is used, a quantity of the two reactants are placed in an appropriate apparatus which may comprise a flask provided with a reflux condenser, if the reaction is to be effected at atmospheric pressure, or in a rotating autoclave if superatmospheric pressures are to be employed. In addition, the reaction apparatus is also charged with a solvent of the type hereinbefore set forth, and if so desired, an alkaline substance. The mixture is then heated to the desired operating temperature and maintained thereat for a predetermined residence time which may range from 0.5 up to about 10 hours or more in duration. Upon completion of the desired residence time, heating is discontinued and the apparatus is allowed to return to room temperature. In the event that superatmospheric pressures have been employed, said pressures being provided for by the introduction of an inert gas such as nitrogen into the reaction zone, the excess pressure is discharged and the apparatus is opened. The reaction mixture is recovered and the desired product is recovered by conventional means, said conventional means including separation, washing, drying, fractional distillation, fractional crystallization, etc.

It is also contemplated that the novel compounds of the present invention may be prepared in a continuous manner of operation. When this type of operation is employed, the halo-substituted cycloalkadiene and the dihalobicyclooctadiene are continuously charged to the reaction vessel which is maintained at the proper operating conditions of temperature and pressure. The particular solvent which has been chosen is also continuously charged to the reactor through a separate line, or, if so desired, it may be admixed with one or both of the reactors prior to entry into said reactor. Upon completion of the desired residence time, the reactor effluent is continuously withdrawn from the reaction zone and subjected to separation means whereby the solvent and unreacted starting materials are separated from the desired halo-substituted naphthalene or halo-substituted phenanthrene compounds, said unreacted starting materials and solvent being recycled to form a portion of the feed stock while the desired reaction product is passed to storage.

The aforementioned polyhalo-substituted ethylenepolyhydroalkanonaphthalenes and polyhalo-substituted ethylenepolyhydrodialkanophenanthrenes are admixed with polymeric compounds of the type hereinbefore set forth in greater detail, said polymeric compounds including polymers, resins, polycondensates, rubbers, textiles, and fibers, etc., to form novel compositions of matter which possess the desirable physical characteristics of being fire resistant or flame retardant. The novel compounds of the present invention are present in an amount ranging from about 5 to 50% by weight of the final composition of matter. The desired compositions of matter are prepared in any suitable manner and may be admixed with the polymeric substance in a mixer, may be milled or may be extruded after admixing by any means well-known in the art. Some representative examples of these novel compositions of matter will include a mixture of polypropylene and 1,2,3,4,9,9-hexachloro-5,6-(1,2-dichloroethylene)-1,4,4a,5,6,8a-hexahydro-1,4-methanonaphthalene;
polyethylene and 1,2,3,4,9,9-hexachloro-5,6-(1,2-dichloroethylene)-1,4,4a,5,6,8a-hexahydro-1,4-methanonaphthalene;
polystyrene and 1,2,3,4,9,9-hexachloro-5,6-(1,2-dichloroethylene)-1,4,4a,5,6,8a-hexahydro-1,4-methanonaphthalene;
polyethylene oxide and 1,2,3,4,9,9-hexachloro-5,6-(1,2-dichloroethylene)-1,4,4a,5,6,8a-hexahydro-1,4-methanonaphthalene;
epoxy resin and 1,2,3,4,9,9-hexachloro-5,6-(1,2-dichloroethylene)-1,4,4a,5,6,8a-hexahydro-1,4-methanonaphthalene;
ABS and 1,2,3,4,9,9-hexachloro-5,6-(1,2-dichloroethylene)-1,4,4a,5,6,8a-hexahydro-1,4-methanonaphthalene;
1,2-dichloro-5,6-(1,2-dichloroethylene)-1,4,4a,5,6,8a-hexahydro-1,4-methanonaphthalene;
1,2,3,4,9,9-hexabromo-5,6-(1,2-dibromoethylene)-1,4,4a,5,6,8a-hexahydro-1,4-methanonaphthalene;
1,2-dichloro-9,10-(1,2-dichloroethylene)-1,4,4a,5,5a,8,8a,9,10,10a-decahydro-1,4,5,8-dimethanophenanthrene;
1,2,3,4,5,6,7,8,11,11,12,12-dodecachloro-9,10-(1,2-dichloroethylene)-1,4,4a,5,5a,8,8a,9,10,10a-decahydro-1,4,5,8-dimethanophenanthrene;
1,2,3,4,5,6,7,8,11,11,12,12-dodecabromo-9,10-(1,2-bromoethylene)-1,4,4a,5,6,8a-hexahydro-1,4-dimethanophenanthrene, etc. It is to be understood that the aforementioned compositions of matter are only reprentative of those compositions which comprise the present invention and that said invention is not necessarily limited thereto.

It is also contemplated within the scope of this invention that the compositions of matter set forth in the above paragraph may also contain at least one compound containing a metal of Group IV-A or V-A of the Periodic Table or combination of metals selected from the above groups such as tin dioxide, tin trioxide, dibutyl tin maleate, antimony trioxide, arsenic trioxide, bismuth trioxide, phosphorus containing compounds, etc.

The following examples are given to illustrate the process of the present invention which, however, are not intended to limit the generally broad scope of the present invention in strict accordance therewith.

EXAMPLE I

In this example, 0.01 mole of 7,8-dichlorobicyclo-[4.2.0]-octadiene-2,4 and 0.02 mole of hexachlorocyclopentadiene were placed in a round bottom flask provided with stirring and reflux means. The mixture was heated to a temperature of 85° C. and maintained in a range of from about 85° C. to about 158° C. for a period of 7 hours. At the end of this time, heating was discontinued and the reaction vessel allowed to return to room temperature. The reaction mixture was recovered and found to contain a 42 mole percent yield of 1,2,3,4,9,9-hexachloro - 5,6 - (1,2 - dichloroethylene) - 1,4,4a,5,6,8a-hexahydro-1,4-methanonaphthalene based on the bicyclooctadiene charged.

EXAMPLE II

To illustrate the effect of utilizing the solvent and an alkaline substance along with the reactants, a second experiment was performed when 0.02 mole of 7,8-dichlorobicyclo-[4.2.0]-octadiene-2,4 and 0.06 mole of hexachlorocyclopentadiene were placed in a round bottom flask equipped with a reflux condenser along with 20 cc. of xylene and 0.01 mole of potassium carbonate. The flask was heated to a temperature of 140° C. and maintained thereat for a period of 8 hours. At the end of this time, heating was discontinued and the flask allowed to return to room temperature. The reaction product was recovered and subjected to nuclear magnetic resonance and infrared analyses. It was found that the desired product comprising 1,2,3,4,9,9 - hexachloro - 5,6 - (1,2-dichloroethylene)-1,4,4a,5,6,8a - hexahydro - 1,4 - methanonaphthalene was recovered in 97 mole percent yield based on the bicyclooctadiene charge. The crystals had a melting point of 130–132° C. Further analysis disclosed the following results:

Calculated for $C_{13}H_8Cl_8$ (percent): C, 34.86; H, 1.80; Cl, 63.33. Found (percent): C, 35.24; H, 2.04; Cl, 62.90.

EXAMPLE III

A mixture comprising 0.02 mole of 7,8-dibromobicyclo-[4.2.0]-octadiene-2,4 and 0.05 mole of hexabromocyclopentadiene along with 25 cc. of xylene and 0.01 mole of potassium carbonate is heated in a round bottom flask at a temperature of 148° C. for a period of 8 hours, the mixture being constantly stirred during the reaction period. At the end of this time, heating is discontinued, the flask is allowed to return to room temperature and the reaction mixture is recovered. Analyses of the product by means of nuclear magnetic resonance and infrared methods will disclose the presence of a substantial amount of 1,2,3,4,9,9-hexabromo-5,6-(1,2-dibromoethylene)-1,4,4a,5,6-8a-hexahydro-1,4-methanonaphthalene.

EXAMPLE IV

In this example a mixture comprising 0.1 mole of 7,8-dichlorobicyclo-[4.2.0]-octadiene-2,4 and 0.04 mole of hexachlorocyclopentadiene along with 20 cc. of xylene and 0.01 mole of potassium carbonate is placed in a round bottom flask provided with stirring and reflux means. The flask is heated to a temperature of 150° C. and maintained thereat for a period of 8 hours. At the end of this time, heating is discontinued and the flask allowed to return to room temperature. The reaction product is recovered and subjected to analyses similar in nature to that in the above examples. These analyses will confirm the presence of a substantial amount of 1,2,3,4,5,6,7,8,11,11,12,12 - dodecachloro - 9,10 - (1,2-dichloroethylene) - 1,4,4a,5,5a,8,8a,9,10,10a - decahydro-1,4,5,8-dimethanophenanthrene.

When a mixture of 0.01 mole of 7,8-dibromobicyclo-[4.2.0]-octadiene-2,4 and 0.04 mole of hexabromocyclopentadiene is treated in a similar manner, the compound which is obtained will be 1,2,3,4,5,6,7,8,11,11,12,12-dodecabromo - 9,10 - (1,2-dibromoethylene)-1,4,4a,5,5a,8,8a,9,10,10a-decahydro-1,4,5,8-dimethanophenanthrene.

EXAMPLE V

In this example 0.01 mole of 7,8-dichlorobicyclo-[4.2.0]-octadiene-2,4 and 0.02 mole of 1,2,3,4-tetrachlorocyclohexadiene-1,3 along with 20 cc. of xylene and 0.01 mole of sodium carbonate are placed in the glass liner of a rotating autoclave. The autoclave is sealed and nitrogen pressed in until an initial pressure of 25 atmospheres is reached. The autoclave is then heated to a temperature of 125° C. and maintained thereat for a period of 4 hours. At the end of this time, heating is discontinued, the autoclave is allowed to return to room temperature and the excess pressure is discharged. The autoclave is opened and the reaction mixture is recovered therefrom. Analysis of this mixture will disclose the presence of 1,2,3,4-tetrachloro-5,6-(1,2-dichloroethylene)-1,4,4a,5,6,8a-hexahydro-1,4-ethanonaphthalene.

EXAMPLE VI

A flame retardant composition of matter is prepared by milling 90 parts per weight of commercial high molecular weight of polypropylene and 10 parts per weight of 1,2,3,4,9,9-hexachloro - 5,6 - (1,2-dichloroethylene)-1,4,4a,5,6,8a-hexahydro - 1,4 - methanonaphthalene. The milled composition of matter is then cut into strips which contain a glass cloth in the center of the strip to prevent dripping during a combustion test. In addition, another strip consisting only of polypropylene is prepared and cut. The strips are then subjected to a combustion test in an apparatus similar to the one described by C.P. Feinmore and J. F. Martin in the November 1966, issue of Modern Plastics. The strip which contains only untreated polypropylene will be an oxygen index (the lowest mole fraction of oxygen sufficient to maintain combustion) of $n=0.180$ and a rate of burning in air of 55 seconds per inch. In contrast to this, the strip of polypropylene which contains the polyhalo-substituted naphthalene will have an oxygen index greater than 0.180 and a correspondingly slower rate of burning in seconds per inch.

EXAMPLE VII

In this example a similar test is prepared by milling 85 parts of polyethylene and 15 parts of 1,2,3,4,9,9-hexachloro-5,6-(1,2 - dichloroethylene) - 1,4,4a,5,6,8a - hexahydro-1,4-methanonaphthalene and cutting the milled composition of matter into strips. To illustrate the fire retardant properties of the compositions of matter a second strip is prepared consisting only of commercial polyethylene. Upon comparing the oxygen indices and rate of burning in air of the two strips, it will be found that the polyethylene strip which contains the 1,2,3,4,9,9-hexachloro-5,6-(1,2 - dichloroethylene) - 1,4,4a,5,6,8a - hexahydro-1,4-methanonaphthalene will possess a greater oxygen index and a correspondingly slower rate of burning than that which is found in the strip containing only the polyethylene.

EXAMPLE VIII

In this example 1,2,3,4,9,9-hexachloro-5,6-(1,2-dichloroethylene)-1,4,4a,5,6,8a-hexahydro - 1,4 - methanonaphthalene is admixed with commercial ABS (a polymer comprising acrylonitrile butadiene and styrene) in a proportion so that the finished sample contains 20 parts of the polychlorinated-substituted methanonaphthalene. The strip is prepared by milling the two components for five minutes at a temperature of 185° C. In addition, a second strip which consists only of the commercial ABS is prepared and the two strips are then subjected to a combustion test similar to that described in Example I above. The strip which consists only of commercial ABS will possess an oxygen index of 0.183 and have a rate of burning in air of 104 seconds per inch. In contrast to this the strip of ABS which contains the 1,2,3,4,9,9-hexachloro-5,6-(1,2-dichloroethylene)-1,4,4a,5,6,8a - hexahydro-1,4-methanonaphthalene will be found to possess an oxygen index in excess of 0.183 and will also have a rate of burning in air longer than the aforementioned 104 seconds per inch.

EXAMPLE IX

In like manner a composition of matter is prepared by admixing 15 parts of 1,2,3,4,5,6,7,8,11,11,12,12-dodecachloro-9,10-(1,2 - dichloroethylene) - 1,4,4a,5,5a,8,8a,9,10,10a - decahydro-1,4,5,8-dimethanophenanthrene with 85 parts of a commercial ABS formulation. After milling the two components for a period of 5 minutes at 185° C., the resultant composition of matter is cut into strips. Likewise, another strip is prepared consisting only of the commercial ABS formulation. The two strips are then subjected to a combustion test similar to that hereinbefore described where it will be found that the strips comprising the composition of matter are milled and ABS and 1,2,3,4,5,6,7,8,11,11,12,12 - dodecachloro - 9,10-(1,2-dichloroethylene) - 1,4,4a,5,5a,8,8a,9,10,10a - decahydro-1,4,5,8-dimethanophenanthrene will be found to possess an oxygen index greater than that of the commercial ABS alone and a correspondingly slower rate of burning.

EXAMPLE X

A novel composition of matter is prepared by admixing commercial polyphenyl ether and 1,2,3,4,9,9-hexabromo - 5,6 - (1,2-dibromoethylene - 1,4,4a,5,6,8a - hexahydro-1,4-methanonaphthalene in an amount so that the finished composition of matter contains 90 parts of the ether and 10 parts of polyhalo-substituted naphthalenes. The resulting composition of matter is cut into strips and subjected to a combustion test along with a strip which consists only of polyphenyl ether flexibility of the polyphenyl ether which contains 1,2,3,4,9,9-hexabromo-5,6-(1,2-dibromoethylene) - 1,4 - methanonaphthalene is oxidized and the oxidative stability is improved as compared to the polypropylene ether which does not contain only flame retardant additives.

I claim as my invention:

1. A compound having the formula:

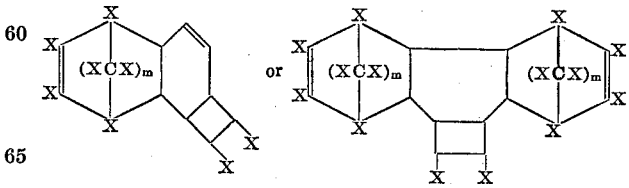

in which X is hydrogen, chlorine or bromine, at least two X's being chlorine or bromine, and $m$ is an integer of from 1 to 4.

2. The compound of claim 1 being 1,2,3,4,9,9-hexachloro - 5,6 - (1,2 - dichloroethylene)-1,4,4a,5,6,8a-hexahydro-1,4-methanonaphthalene.

3. The compound of claim 1 being 1,2,3,4,9,9-hexabromo - 5,6 - (1,2 - dibromoethylene)-1,4,4a,5,6,8a-hexahydro-1,4-methanonaphthalene.

4. The compound of claim 1 being 1,2,3,4,5,6,7,8,11,11,12,12 - dodecachloro - 9,10 - (1,2 - dichloroethylene)-1,4,4a,5,5a,8,8a,9,10,10a-decahydro - 1,4,5,8 - dimethanophenanthrene.

5. The compound of claim 1 being 1,2,3,4,5,6,7,8,11,11,12,12 - dodecabromo - 9,10 - (1,2 - dibromoethylene)-1,4,4a,5,5a,8,8a,9,10,10a - decahydro - 1,4,5,8 - dimethanophenanthrene.

6. The compound of claim 1 being 1,2,3,4-tetrachloro-5,6 - (1,2 - dichloroethylene) - 1,4,4a,5,6,8a - hexahydro-1,4-methanonaphthalene.

References Cited

UNITED STATES PATENTS 2,382,038   8/1945   Bruson _____ 260—648 C

DANIEL D. HORWITZ, Primary Examiner

U.S. Cl. X.R.

260—45.7